(12) United States Patent
Takahashi (10) Patent No.: US 7,058,287 B2
(45) Date of Patent: Jun. 6, 2006

(54) INFORMATION SIGNAL PROCESSING METHOD

(75) Inventor: Hirokazu Takahashi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 08/385,746

(22) Filed: Feb. 8, 1995

(65) Prior Publication Data

US 2003/0081941 A1    May 1, 2003

Related U.S. Application Data

(63) Continuation of application No. 08/133,789, filed on Oct. 8, 1993, now abandoned, which is a continuation of application No. 07/450,926, filed on Dec. 14, 1989, now abandoned.

(30) Foreign Application Priority Data

Dec. 19, 1988    (JP)    ................................. 63-320026

(51) Int. Cl.
    H04N 5/928    (2006.01)
(52) U.S. Cl. ........................................ 386/96; 386/106
(58) Field of Classification Search ................ 358/311, 358/341, 343, 909.1, 342, 906; 360/19.1, 360/14.1, 14.3, 22; 386/95, 96, 125, 97, 386/104, 105, 106, 126
See application file for complete search history.

(56) References Cited

U.S. PATENT DOCUMENTS

| | | | | |
|---|---|---|---|---|
| 4,746,993 A | * | 5/1988 | Tada ........................... 386/107 |
| 4,775,898 A | * | 10/1988 | Akabane et al. ......... 358/909 X |
| 4,777,537 A | * | 10/1988 | Ueno et al. .................. 358/341 |
| 4,910,600 A | * | 3/1990 | Kondo .................... 358/909 X |
| 4,931,878 A | * | 6/1990 | Takei et al. ............ 360/19.1 X |
| 4,947,265 A | * | 8/1990 | Hayashi et al. ............. 358/341 |
| 4,965,675 A | * | 10/1990 | Hori et al. .................. 358/341 |
| 5,038,217 A | * | 8/1991 | Hayashi et al. ............. 358/341 |
| 5,130,812 A | * | 7/1992 | Yamaoka ..................... 358/341 |
| 5,164,841 A | * | 11/1992 | Takahashi ................... 358/341 |

* cited by examiner

*Primary Examiner*—Huy Nguyen
(74) *Attorney, Agent, or Firm*—Fitzpatrick, Cellar, Harper & Scinto (57) ABSTRACT

A recording apparatus includes memory for storing a sequence of access to a plurality of recording blocks of a recording medium in which first information signals are recorded, the first information signals being correlated with second information signals to be recorded, and a recorder for recording the second information signals on the recording medium according to the sequence of access stored in the memory, the sequence of access indicating the sequence in which the first information signals are to be reproduced.

7 Claims, 14 Drawing Sheets

```
                              5  — TRACK
       P  R  O  G  R  A  M       NUMBER
    1     2    20    14    19
    5
```

FIG. 6

```
       P  R  O  G  R  A  M
    1     2    20    14    19
    5    10    30    25
    PROGRAM FULL
```

FIG. 7

```
                              20
       P  R  O  G  R  A  M
    1     2    20    14    19
    5    10
    CHECK TRACK NO.
```

INFORMATION SIGNAL PROCESSING METHOD

This application is a continuation division, of application Ser. No. 08/133,789, filed Oct. 8, 1993 now abandoned, which was a continuation of application Ser. No. 07/450,926, filed Dec. 14, 1989 now abandoned.

BACKGROUND OF THE INVENTION

1. Field of the Invention

The present invention relates to a recording apparatus capable of recording a first information signal and a second information signal related to the first information signal, in a mutually correlated manner.

2. Related Background Art

As an example of such a recording system for recording first and second recording signals, there is already known a structure for recording audio signals on a magnetic disk serving as the recording medium on which an image signal is already recorded, and a structure for simultaneously recording image signals and corresponding audio signals on a recording medium.

In such conventional examples, the audio recording has to be made in the sequence of tracks on the magnetic disk, and such a condition causes a considerable limitation in the relation with the image tracks (tracks on which an image signal is recorded) with which the audio tracks have to be correlated, and is a factor limiting the freedom of audio recording.

SUMMARY OF THE INVENTION

In consideration of the foregoing, an object of the present invention is to provide an apparatus capable of recording first and second information signals in an arbitrary manner.

Another object of the present invention is to provide a novel apparatus capable of recording a still image and an audio signal associated with the still image, in arbitrary manner.

Still another object of the present invention is to provide an apparatus capable, in recording a continuous audio signal, of recording the audio signal in a predetermined area of the recording medium.

The above-mentioned objects can be attained, according to a preferred embodiment of the present invention, by an apparatus provided with memory means for storing a sequence of access to the tracks in which recorded images are to be correlated with the audio signals to be recorded, wherein the audio signal is recorded in continuous manner, according to the sequence stored in the memory means.

Still other objects of the present invention, and the advantages thereof, will become fully apparent from the following description of the embodiments to be taken in conjunction with the attached drawings.

DESCRIPTION OF THE PREFERRED EMBODIMENTS

Figure 1A:
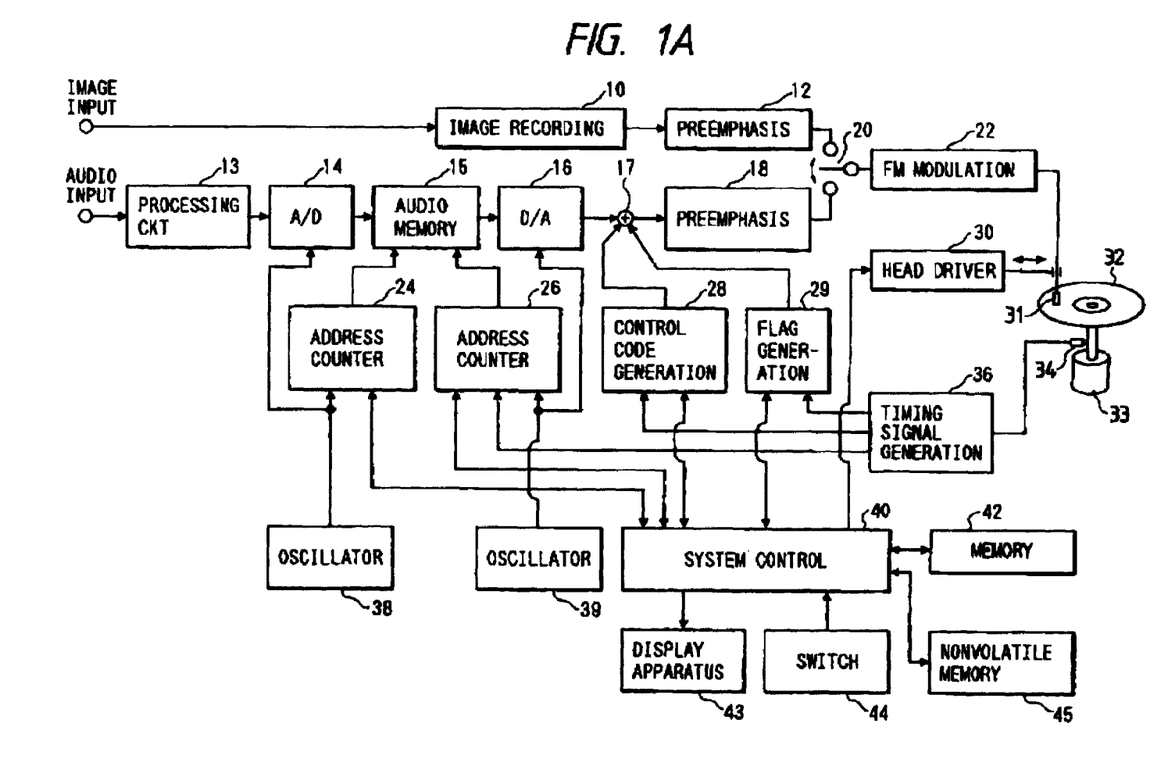
FIG. 1A is a block diagram of a recording system of an embodiment of the present invention.
Figure 1B:
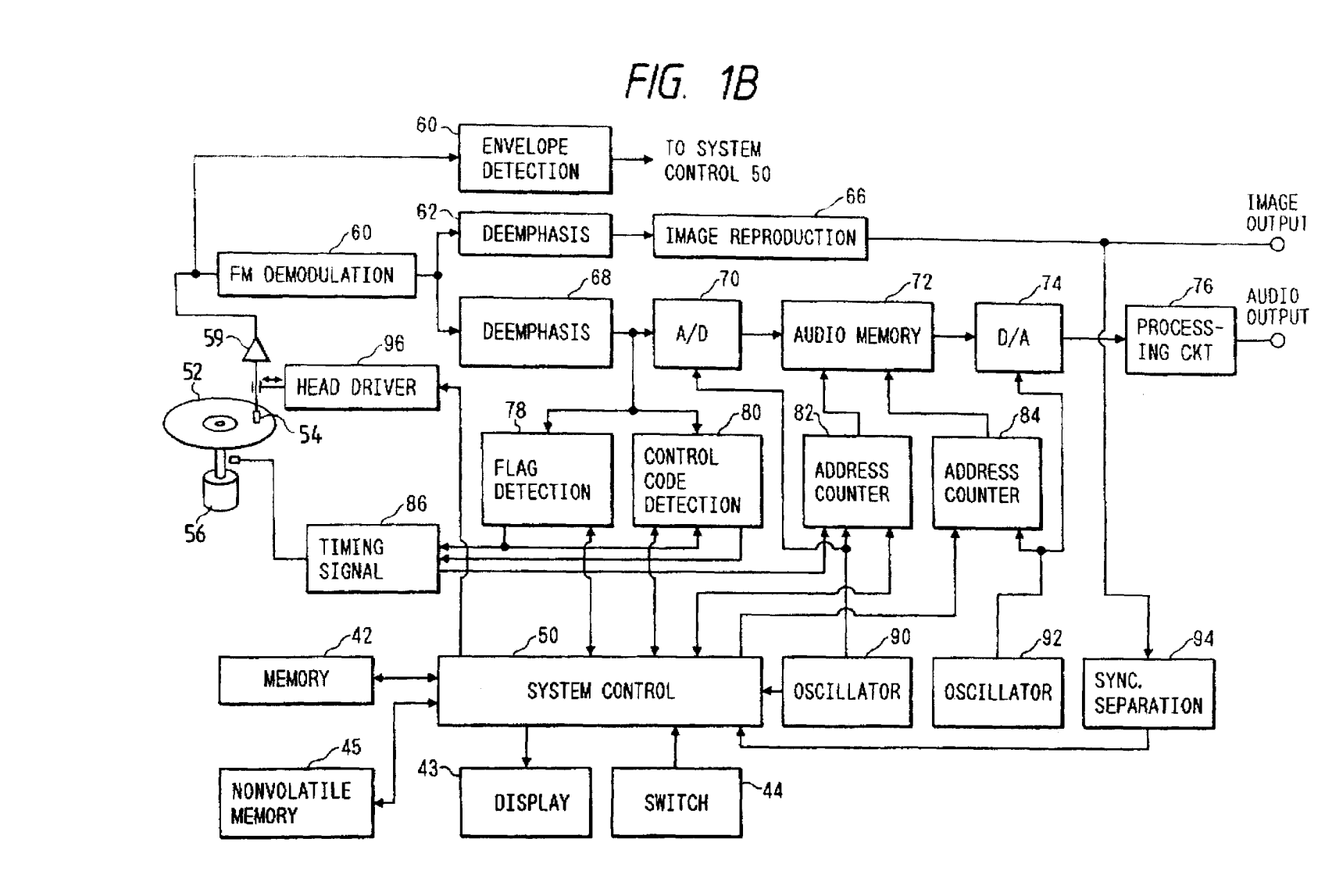
FIG. 1B is a block diagram of a reproduction system thereof.

Now the present invention will be clarified in detail by embodiments thereof shown in the attached drawings. FIG. 1A is a block diagram of a recording system of an embodiment of the present invention, and FIG. 1B is a block diagram of a reproduction system thereof.

At first there will be explained the recording system shown in FIG. 1A. In the case of recording an image signal, a system control circuit 40 shifts a switch 20 to the image side (a), and moves a magnetic head 31 to a designated track position of a magnetic disk 32, by means of a head driver circuit 30, according to the operation of an image signal recording switch in a switch group 44. At the completion of movement of the magnetic head 31, the system control circuit 40 instructs an image recording circuit 10 to fetch the input image signal for a predetermined period. The image recording circuit 10 executes a known process of image recording, and the output of the recording circuit 10 is supplied, through a pre-emphasis circuit 12, a switch 20 and an FM modulation circuit 22, to the magnetic head 31 and is recorded on the magnetic disk 32.

In the case of recording an audio signal, the input audio signal is subjected to noise abatement by a processing circuit 13, and is digitized in an A/D converter 14 by sampling pulses from an oscillator 38. In response to an instruction for starting audio recording from the switches 44, the system control circuit 40 supplies an instruction to an address counter 24 for storing the output of the A/D converter 14 into an audio memory 15 with an audio signal time compression rate selected by the switches 44. When the amount of audio signal stored in the audio memory 15 exceeds the capacity of a track of the magnetic disk 32, or when a command is given for moving to another track or terminating the recording operation, for example, by switching the still image corresponding to the audio signal under recording, the system control circuit 40 moves the magnetic head 31 to an empty track (a track not containing signals) on the magnetic disk 32. The system control circuit 40 then reads the stored data according to address signals provided by an address counter 26 in response to pulses generated by an oscillator 39, and causes D/A converter 16 to convert the data into an analog signal. The D/A converter 16 executes the D/A conversion according to the pulses generated by the oscillator 39. An adder 17 adds to the time compressed audio signal from the D/A converter 16, a control code generated by a control code generator 28 and a flag signal generated by a flag generator 29. The output of the adder 17 is supplied, through a pre-emphasis circuit 18, the switch 20 and the FM modulating circuit 22, to the magnetic head 31 and is recorded on the magnetic disk 32.

The operation of storing the audio signal in the audio memory 15 and recording the signal on the magnetic disk 32 is continued until a command for terminating the audio recording is received or until the recordable empty tracks of the magnetic disk 32 are used up.

In the following there will be explained the function of the reproducing system shown in FIG. 1B. A memory 42, a display unit 43 and switches 44 are common with those in the recording system. The magnetic disk 52 already stores the image and audio signals as explained above. A system control circuit 50 places a magnetic head 54 on a designated track of the magnetic disk 52 by use of a head driver circuit 96. The magnetic disk 52 is rotated at a predetermined speed by means of a known servo mechanism. The output of the magnetic head 54 is amplified by a reproducing amplifier 59, and supplied to an FM demodulating circuit 60. In the case that the reproduced signal is an image signal, the output of the FM demodulating circuit 60 is supplied to a non-linear deemphasis circuit 62, the output of which is subjected to a reproducing process in an image reproducing circuit 66. A synchronization separation circuit 94 separates from the output of the reproducing circuit 66, a synchronization signal and sends it to the system control circuit 50. An envelope detection circuit 60' is provided for discriminating the presence or absence of recording on each track, from the output of the reproducing amplifier 59.

In the case that the reproduced signal is an audio signal, the output of the FM demodulating circuit 60 is supplied to a non-linear de-emphasis circuit 68, the output of which is supplied to a time expansion circuit composed of an A/D converter 70, an audio memory 72 and a D/A converter 74, and is also supplied to a flag detection circuit 78 and a control code detection circuit 80. The flag detection circuit 78 and the control code detection circuit 80 detect the flag signal and the control code, respectively, and send them to the system control circuit 50. In response to the detection of the flag and the control code, a timing signal generator 86 sends an instruction to an address counter 82 to store the output for the A/D converter 70 in succession into the audio memory 72. The A/D converter 70 executes the A/D conversion according to the pulses generated by an oscillator 90. The system control circuit 50 supplies the address counter 84 with an audio time compression rate included in the detected control data, whereby the data stored in the audio memory 72 is read with a speed corresponding to the audio time compression rate. The output data from the audio memory 72 is converted into an analog signal in a D/A converter 74 by using the pulses from an oscillator 92, and is subjected to decoding and noise abatement in processing circuit 76.

The system control circuit 50 constantly inspects the address counters 82 and 84, and when the amount of data stored in the audio memory 72 is reduced, executes reproduction of the recorded signal in a track designated by the control code and the storage of the thus reproduced signal at a position next to the current data in the audio memory 72.

The above-explained operation is continued until a reproduction terminating command is released by a stop switch of the switch group 44, or until the end of an audio sequence is instructed by a flag attached to the audio signal recorded on the magnetic disk 52.

Figure 8A:
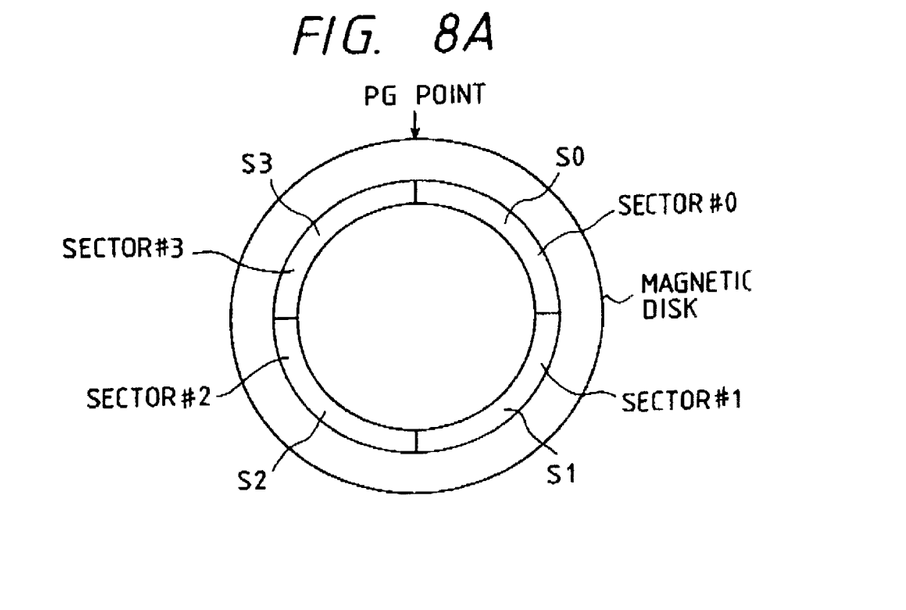
FIG. 8A is a view showing the format of an audio track.
Figure 8B:
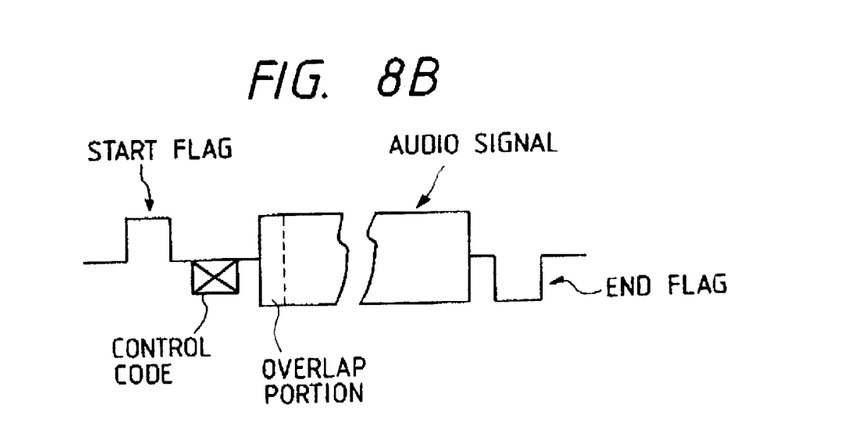
FIG. 8B is a view showing the format of a sector.

FIG. 8A shows the format of an audio track, namely a track of the magnetic disk containing audio signals. The audio track is divided into four sectors S0–S3, each of which if formatted as shown in FIG. 8B. A sector is started by a start flag SF, constituting a start signal of the audio sector. Then, a control code is recorded indicating the time compression rate of the audio signal, the track address of the image signal corresponding to the audio signal, and the start track address and ensuing track address of the audio signal in case the signal is recorded continuously over plural tracks. The audio signal recorded continuously over plural tracks is considered as a block and is hereinafter called an audio sequence. Also, an audio signal recording completed within a track will also be called an audio sequence.

Figure 1C:
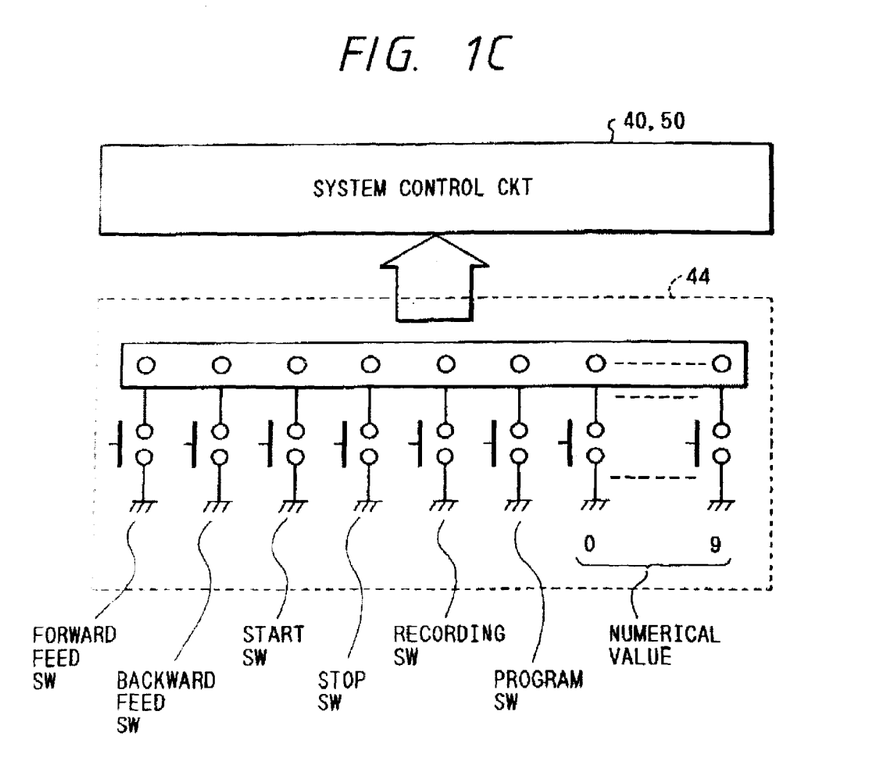
FIG. 1C is a view showing the structure of switch 44.

FIG. 1C shows an example of the structure of the switch group 44, containing various switches as shown therein.

Figure 5:
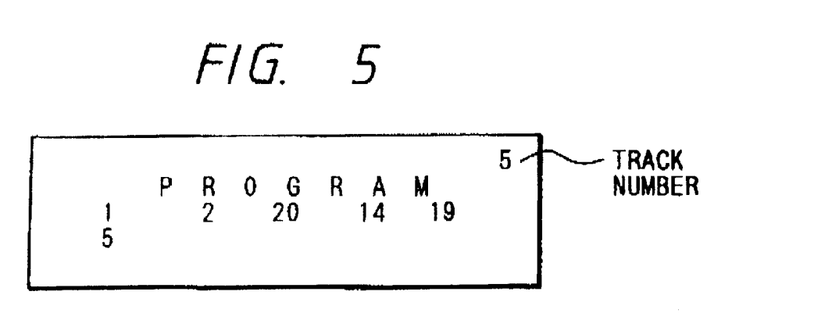
FIGS. 5, 6 and 7 are views showing examples of a display on a monitor.
Figure 6:
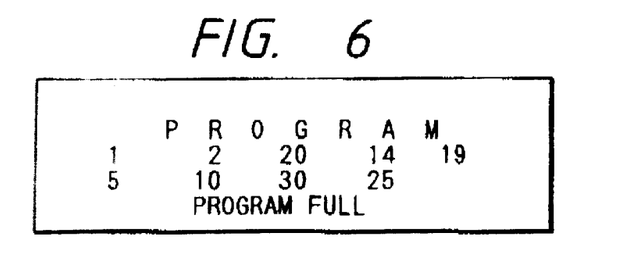
Figure 7:
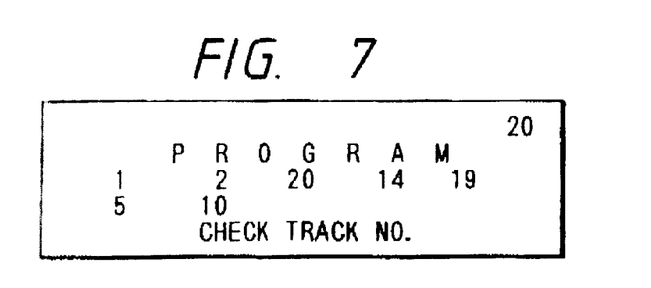

Now reference is made to FIGS. 2A to 4D for explaining the program registration in the audio recording in the above-explained recording/reproducing apparatus. FIGS. 5, 6 and 7, respectively, show examples of a monitor display for program registration, for a full program state and for an alarm. In the following description, the program counter means a counter variably set in a rewritable non-volatile memory 45 (FIG. 1A), indicating a programmable value, such as the number of empty tracks. The program counter or the count thereof will hereinafter be represented by PC.

When the magnetic disk is loaded, the reproducing circuit shown in FIG. 1B is at first activated to discriminate the presence or absence of recording in each recording track. At first there will be explained the procedure of program registration, with reference to FIGS. 2A and 2B. In response to the actuation of a program switch PROGRAM shown in FIG. 1C, the system control circuit 50 discriminates the presence or absence of already program registered tracks by reference to the count of the above-mentioned program counter PC, and, if absent, sets the number of empty tracks of the loaded magnetic disk in the program counter PC (steps S1, S2). Then, the system control circuit 50 discriminates if the PC is zero (step S3), and, if zero, displays an alarm as shown in FIG. 6, indicating that the program is full (step S30), and the program registration sequence is terminated. If PC is not zero, there is discriminated whether a direct program registration has been instructed (step S4) for directly registering a track, by entering the track number with the numeral keys shown in FIG. 1C, and actuating the program switch PROGRAM within a predetermined time. In the case of direct program registration, it is discriminated whether or not the registration is for the recording of an audio signal only, not corresponding to the image, and is indicated for example by an entered number "0" (step S5). For such registration there may be provided a selector switch for the recording of an audio signal only, in the switch group 44. In case of recording of an audio signal only, the sequence proceeds to a step S25. If an image signal is to be recorded, it is discriminated whether the entered number indicates an existing track number of the magnetic disk, namely "1" to "50" (step S7), and, if not, a warning display is given as shown in FIG. 7 (step S32). If the entered number indicates an existing track, a flag for requesting movement of the head to a track indicated by the entered number is set (step S8) and the process proceeds to step S9.

Figure 2A:
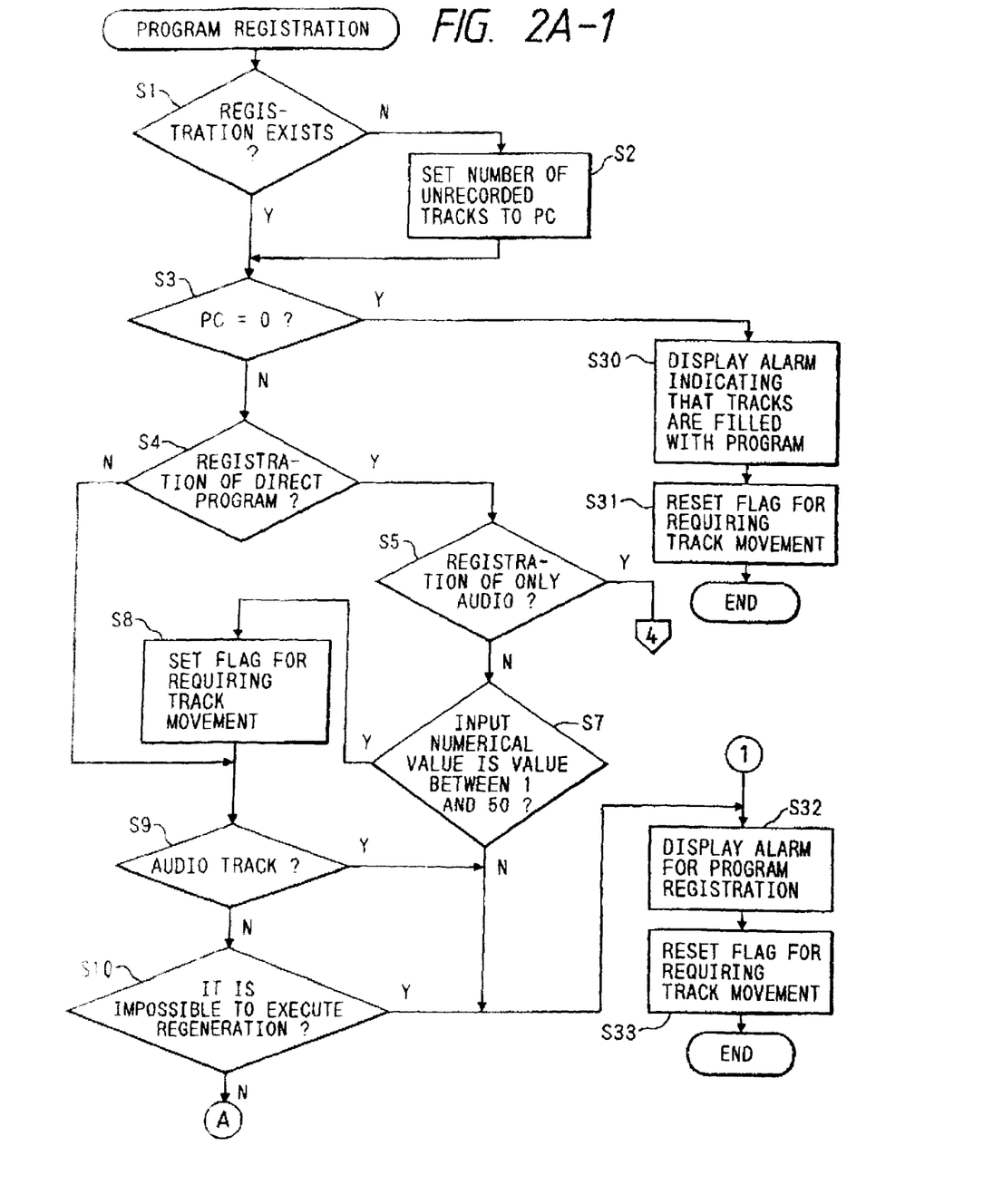
FIGS. 2A and 2B are flow charts of program registration.
Figure 2A:
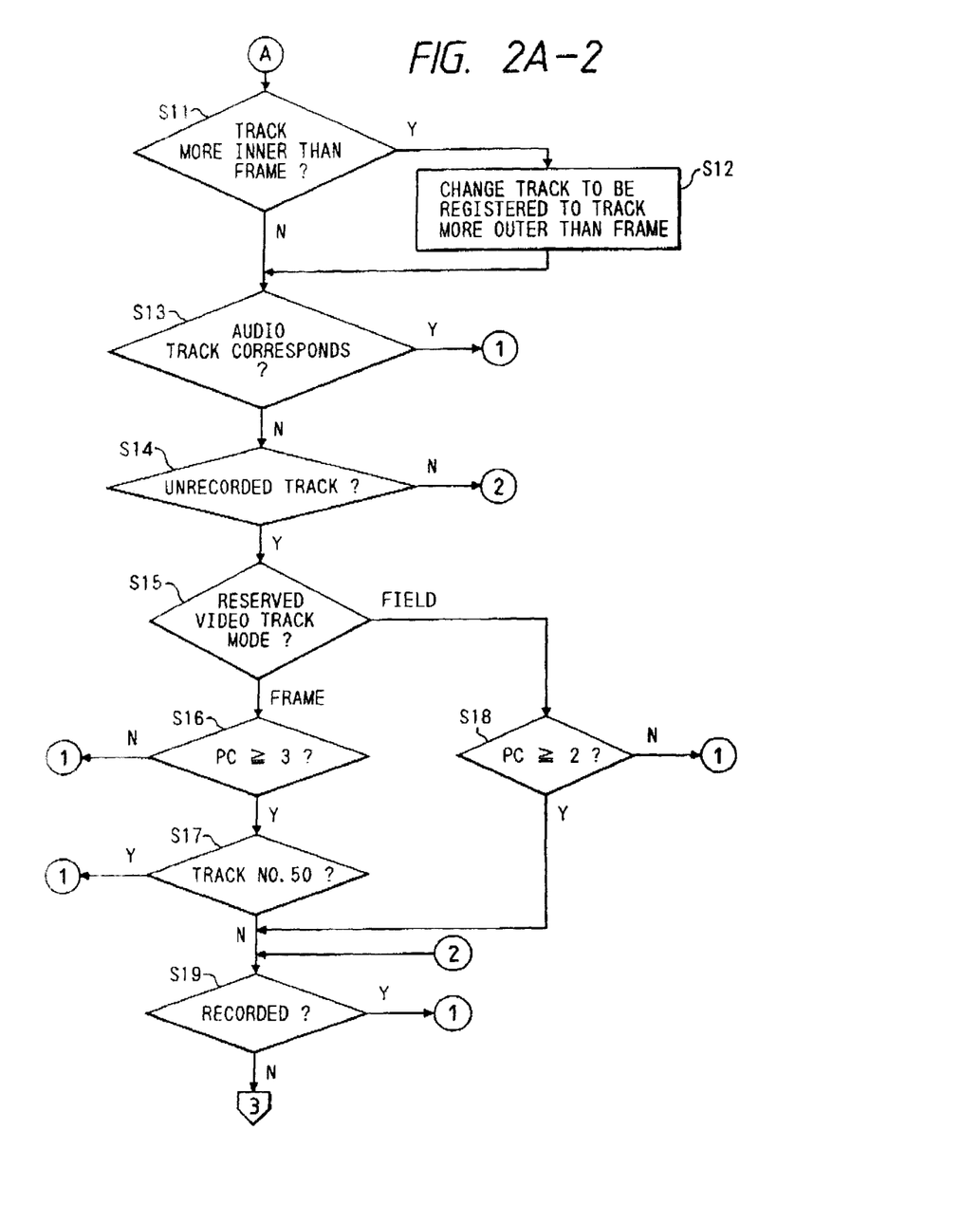
Figure 2B:
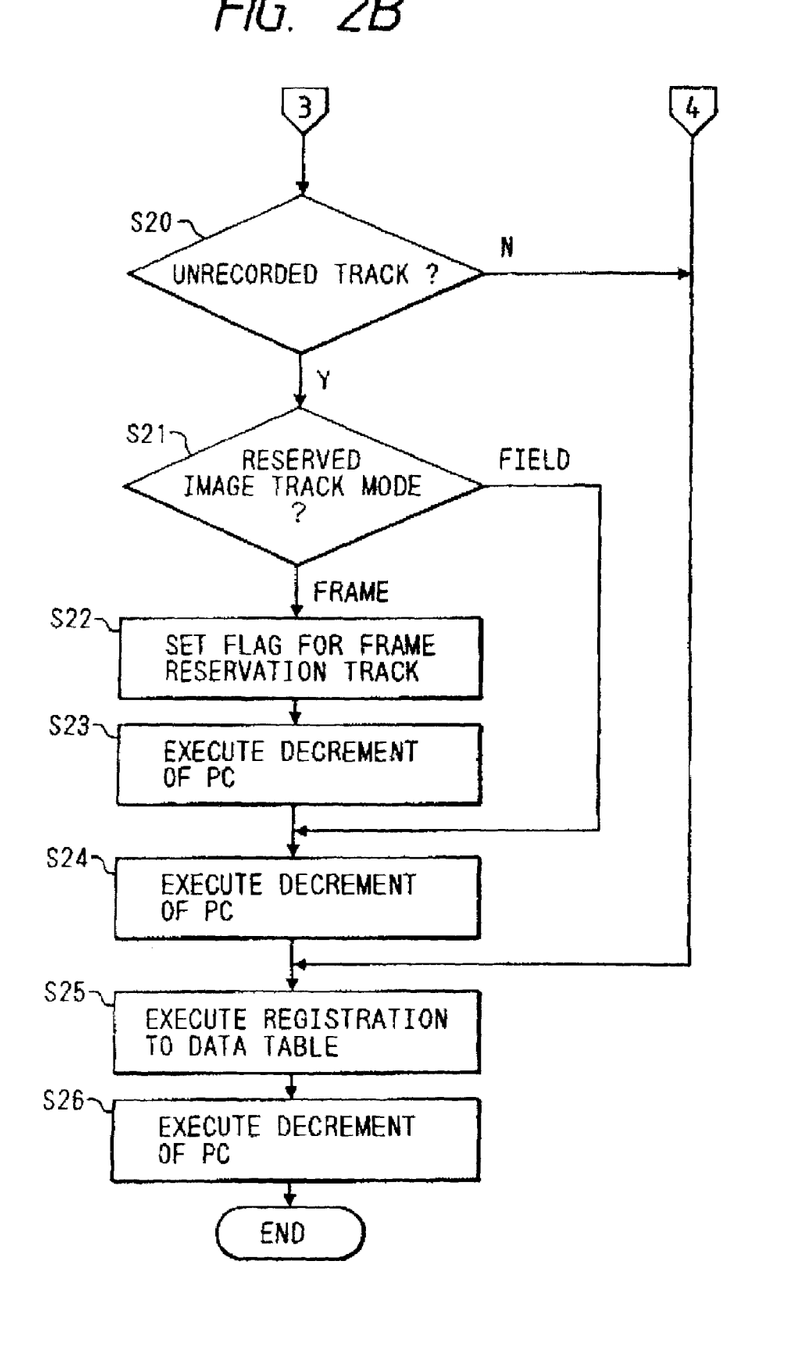

On the other hand, if the direct program registration is not instructed in step S4, the program registration is made on the track of current access and the process proceeds to step S9.

If it is determined in step S9 that the track for program registration is an audio track, a warning that the program registration is not possible is given (step S32). Then, the movement request flag is then reset and the program registration sequence is terminated (step S33). In the circuit shown in FIG. 1B, the sequence is also terminated when the recorded signal is identified as not being reproducible (step S10).

If the track to be registered is an internal track of a frame image signal (step S11), the track number to be registered is changed to that of the external track of the frame image signal (step S12). Then, if an already recorded audio track is present corresponding to the track to be registered (step S13), there is given a warning that the program registration is not possible (step S32), then the movement request flag is reset and the program registration sequence is terminated (step S33). If a corresponding audio track is not present, a determination is made as to whether the track is empty (step S14). If empty, the program registration mode is entered for reserving the track for image recording after the audio recording. A field or frame image recording can be selected by a frame/field selector switch of the switch group 44. The program registration is possible if the PC is at least equal to "3" (step S16) and if the track number to be registered is not "50" in case of the frame mode (step S17), or if the PC is at least equal to "2" in case of the field mode (step S18).

After the above-mentioned discrimination of whether or not the track is available for program registration, a program registration data table is checked for identifying whether the track is already registered (step S19). If already registered, there is given a warning display indicating that the program registration is not possible (step S32), then the movement request flag is reset, and the program registration sequence is terminated (step S33).

In the mode for track reservation for image (step S20), since two empty tracks are required in addition to an audio track in the frame mode, the count PC is reduced by two. In the field mode, the count PC is reduced by one (steps S21–S24).

The track number thus obtained is registered in a position indicated by the PC, in the program registration data table (step S25). In the image track reservation mode in the frame mode, a flag indicating the frame mode is set and registered in the program registration data table. Then the count PC is reduced by one for the audio track (step S26), and the program registration sequence is terminated.

Figure 3:
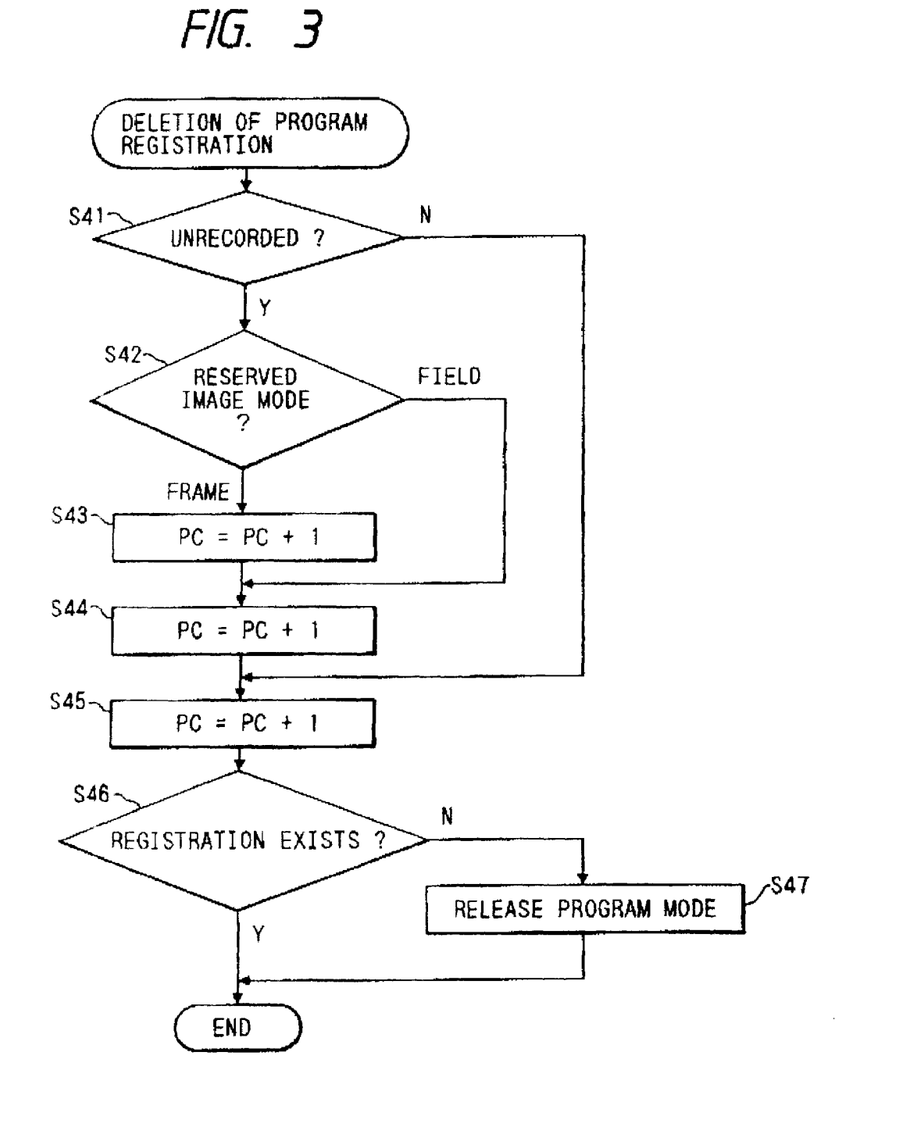
FIG. 3 is a flow chart for deletion of registered data.
Figure 4A:
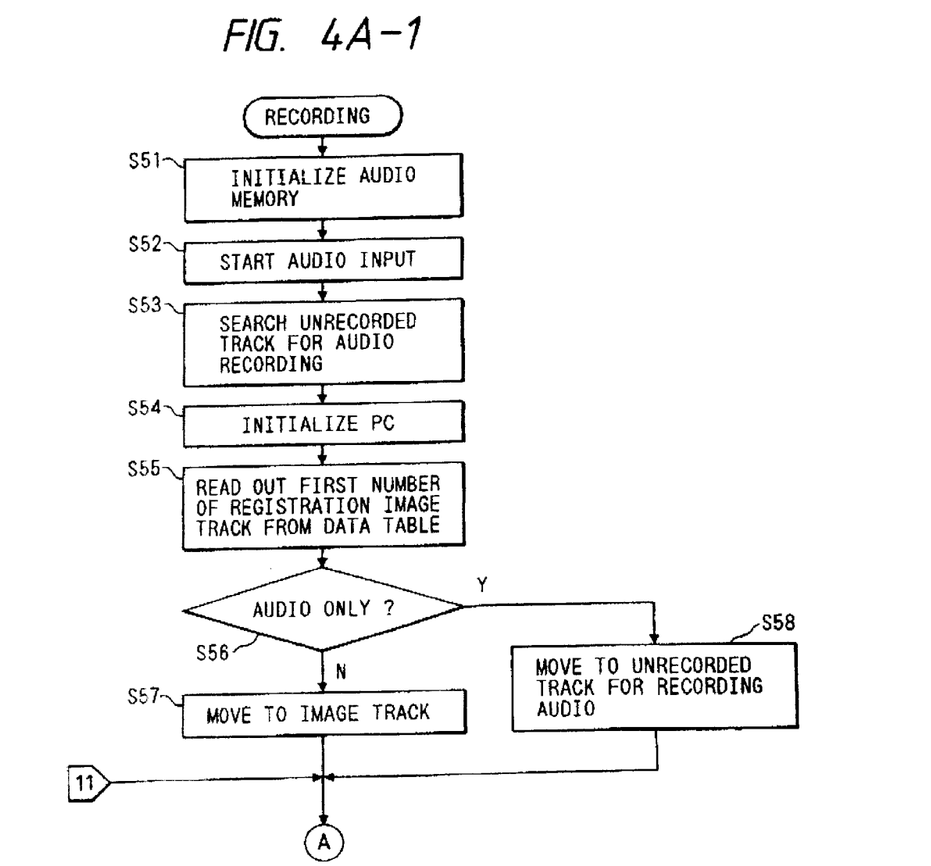
FIGS. 4A, 4B, 4C and 4D are flow charts for programmed audio recording.
Figure 4A:
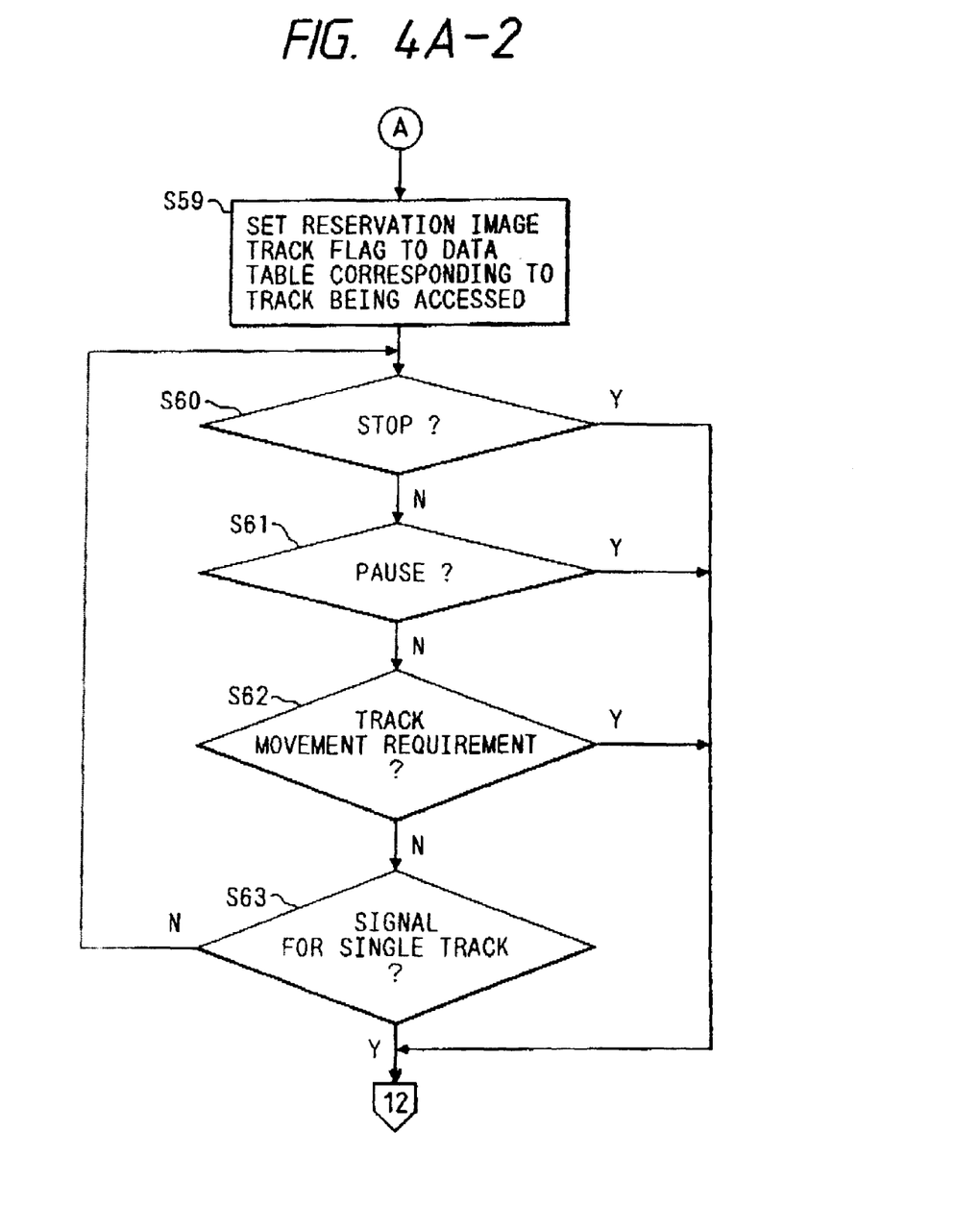
Figure 4B:
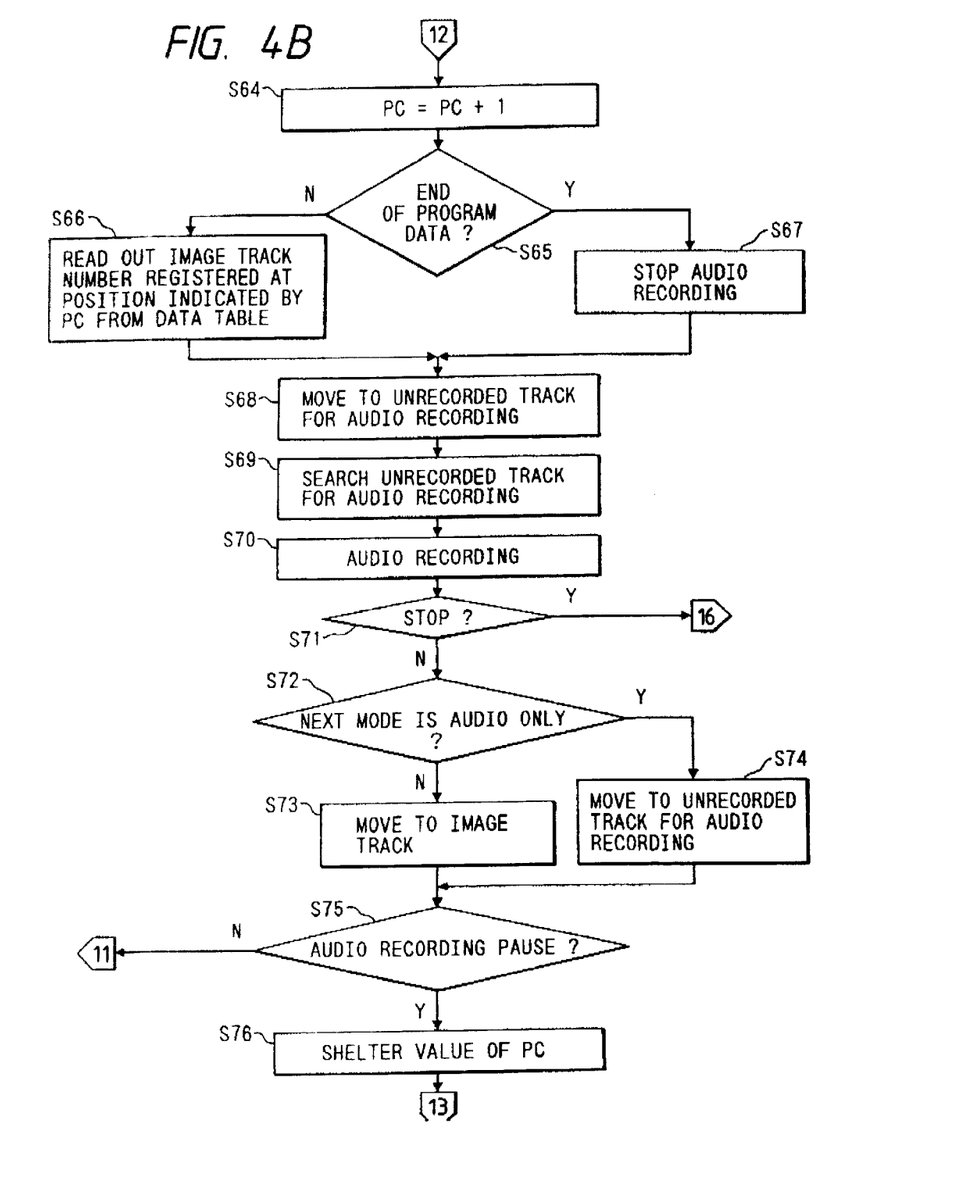
Figure 4C:
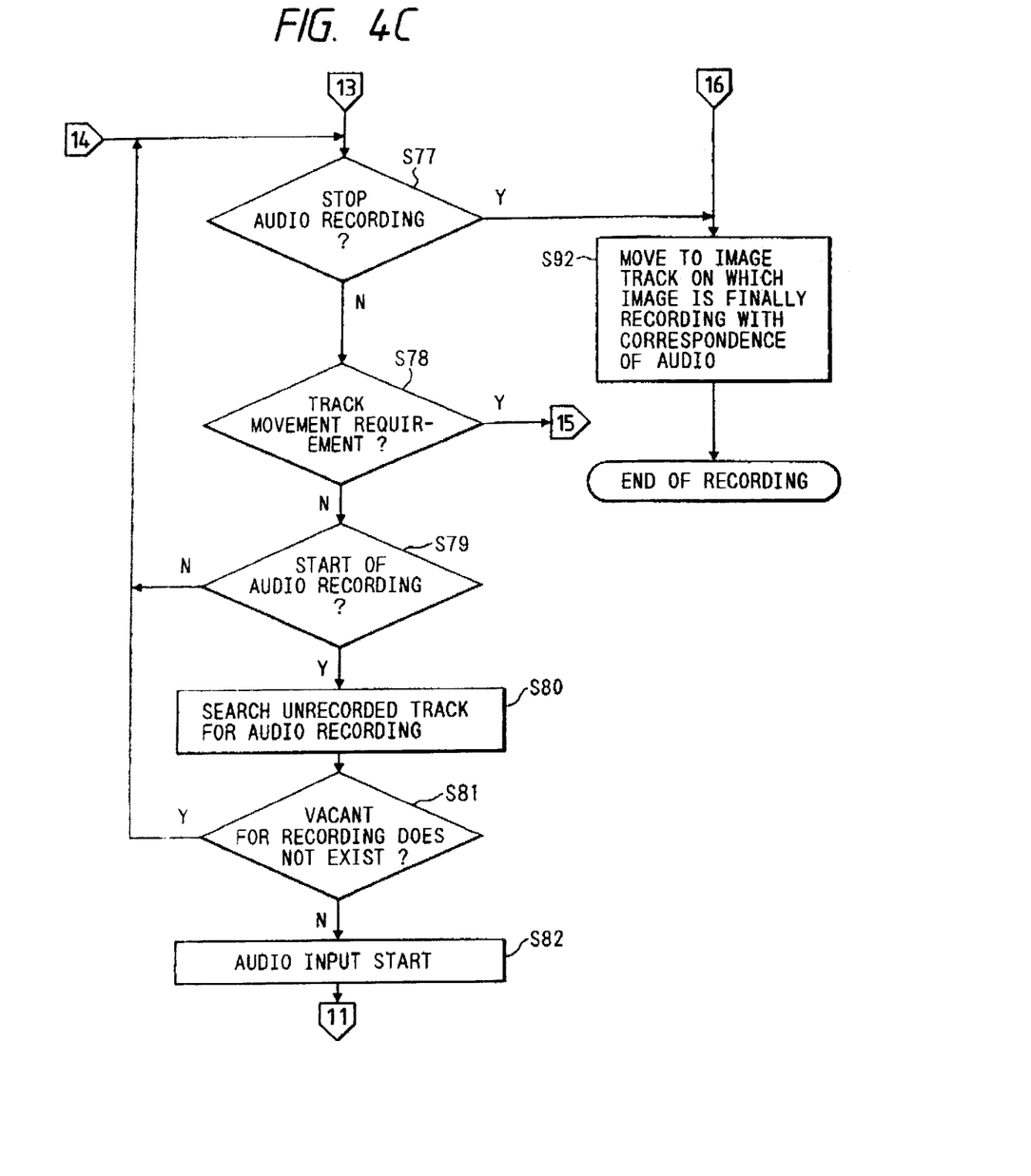
Figure 4D:
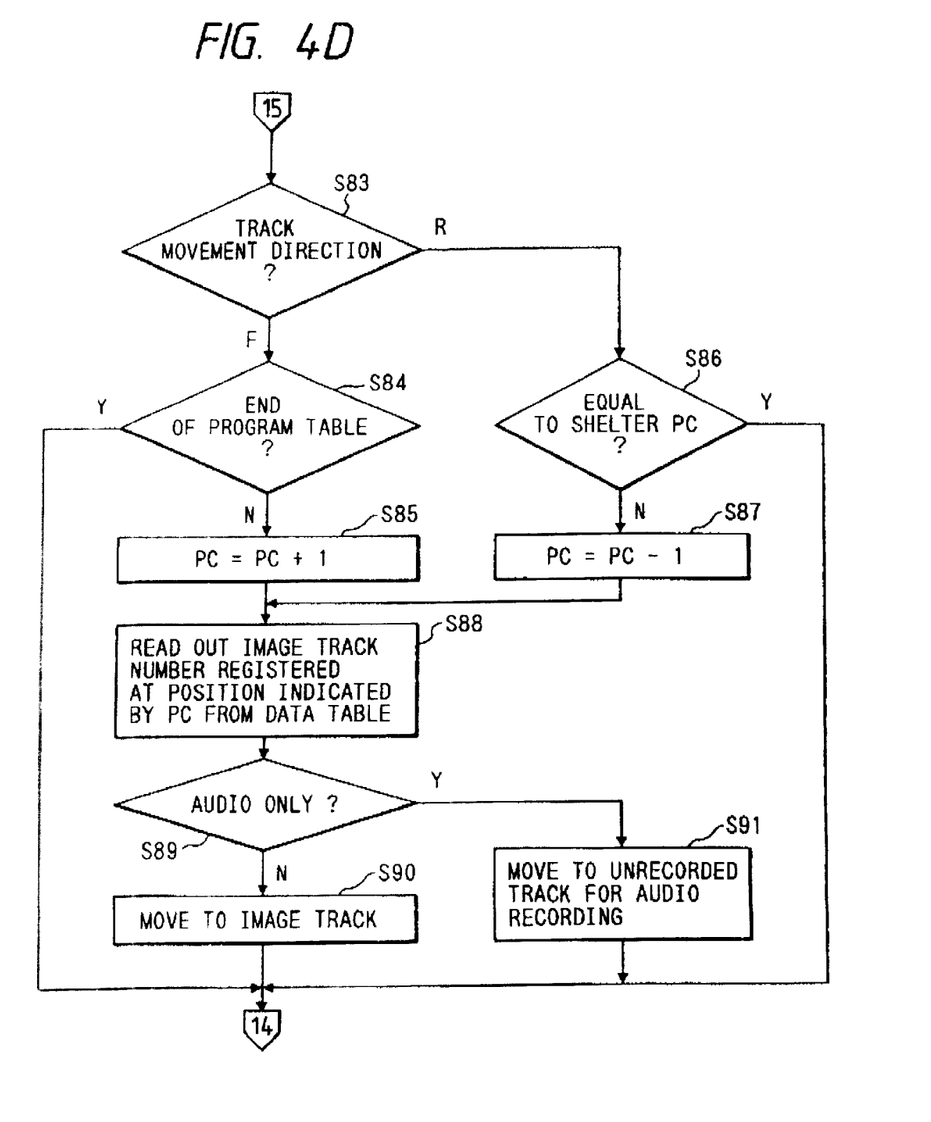

In the following, there will be explained the deletion of program registration, with reference to FIG. 3. For the deletion, a record switch or a stop switch of the switch group 44 is utilized. In the case that the record switch is actuated, the record mode is cancelled and all the program registrations are cleared. On the other hand, if the stop switch is actuated in a program registered state, the registered track number is read from the program registration data table. If the track of the number is empty, namely is a reserved track for image (step S41), the state of the flag indicating the frame recording mode is checked (step S42), and the count PC is increased by two or one, respectively, in the case of the frame mode or field mode (step S43, S44). Then, the count PC is increased by one for the audio track (step S45). Then, the presence or absence of program registration is discriminated, by comparing the count PC and the number of empty tracks (step S46), and if no program registration is left, the program registration mode is cancelled (step S47) to terminate the sequence.

Now reference is made to FIGS. 4A–4D, and there will be explained the recording operation of the audio signal, utilizing the registration in the program data table prepared as explained above. The recording operation of an audio signal in the program mode is initiated by the start switch of the switch group 44. At first, the audio memory is initialized (step S51), and the fetching of the externally entered audio signal into the audio memory is started (step S52). Then, an empty track for recording the audio signal is searched (step S53). The PC is then initialized (step S54) and the track number registered in the program data table from the beginning is read (step S55). The search in step S53 is conducted by the result of discrimination, conducted prior to the step S1, for identifying the presence or absence of recording in each track. If the read track number indicates the audio-only mode (audio recording not corresponding to an image signal) (step S56), the magnetic head is moved to the track on which the audio signal is to be recorded, and the output to the monitor is muted (step S58). In the case that the track number corresponds to an image track or an empty track, the magnetic head is moved to the track, and the output is displayed on the monitor according to the mode of the track. In the case of a field image track or a frame image track, the image track is given to the monitor respectively in the field mode or frame mode. In the case of reservation mode for an image track, the monitor output is muted regardless of the frame or field mode, since access is made to an empty track (step S57).

Except for the audio-only mode, a reserved track flag is set for the data table corresponding to the track being accessed (step S59). However, the reserved image track flag does not affect the already recorded image tracks.

After the initializing operation explained above, the sequence enters a stand-by state for recording (steps S60–S63). The stand-by state is terminated either when the stop switch, forward switch or start (pause) switch of the switch group 44 is actuated, or when a signal of a track has entered the audio memory 15. The content of the PC is increased by one (step S64), and there is discriminated whether the data of program registration has been completed (step S65). If complete, there is started a recording stop state, for automatically terminating the recording operation in response to an audio input from the operator (step (S67). If the registered data still remains, the track number for the next access is read from the program data table (step S66).

Subsequently, the magnetic head is moved to a track for the next audio recording (step S68), then an empty track for the next audio recording is searched (step (S69). The audio signal stored in the audio memory 15 is then recorded on the magnetic disk 32 (step S70). If the audio recording mode is terminated, the sequence proceeds to a step S92. If not terminated, there is discriminated whether the audio-only mode is to be selected, from the track number for next access read in step S66 (step S72), and, in case of the audio-only mode, the magnetic head is moved as in step S58 to an empty track for the next audio recording (step S74). If the track number does not indicate the audio-only mode, the magnetic head is moved as in step S57 to a track indicated by the track number (step S73).

Then, there is discriminated whether the audio recording pause mode is selected (step S75), and, if not, the sequence starting from step S59 is repeated. In the case of the recording pause mode, the current value of the PC is diverted in the memory (step S76), and there is started a stand-by state for recording pause (steps S77–S79). If the head movement is requested by the forward or reverse switch of the switch group 44 in the stand-by state, the head movement is possible according to program registration, within a range from the position of program registration of the pause state to the end of the program registration (steps S83–S91).

If the recording is re-started by the start switch in the pause state, the PC is rendered effective at the actuation of the start switch. Subsequently, an empty track for next audio recording is searched (step S80), and the fetching of the entered audio signal into the audio memory 15 is started (step S82). Thereafter, the sequence starting from step S59 is repeated.

In the case that the recording state is terminated by the actuation of the stop switch in the course of recording by an automatic stopping or by the actuation of the stop switch in the recording pause state, the magnetic head is moved to an image track last recorded in correspondence to the audio signal (or an audio track in case of the audio-only mode)

(step S92), and the recording mode is terminated and switched to the reproduction mode. At this point all of the registered program is erased.

In the present embodiment, the image is automatically switched to the next registered image after the audio recording of a track, but it is also possible to record the audio signal in plural tracks corresponding to an image, by providing an additional switch for switching the registered image, or utilizing another switch such as the forward switch.

Also, the present embodiment is capable of registration of the audio-only mode and registration of an empty track as the reserved image track, so that the audio recording is made possible even if the corresponding images are not completely recorded. Also, there is obtained wider freedom in the procedure and content of the recording. Furthermore, the editing of the contents of the program registration is facilitated by the presence of a mode for entirely clearing the program registration and a mode for clearing the last one of the registered programs.

As will be easily understood from the foregoing, the present embodiment enables, in continuous audio recording, to realize correspondence between the voice and image without being limited by the image recording position on the recording medium.

Though the foregoing embodiment employs a magnetic disk as the recording medium, there may also be employed an optical recording medium, a tape-shaped medium, or a solid-state memory such as a semiconductor memory.

Also, the first and second information signals are not limited to the still image signal and the audio signal explained above, but there can be made various variations.

What is claimed is:

1. An information recording apparatus which records an audio signal by relating the audio signal to an image signal when the image signal or the audio signal is recorded on a recording medium having plural recording areas which differ from each other, said apparatus comprising:
   a designator for designating, in predetermined program mode, from among the plural recording areas of the recording medium, a recording area where the image signal to be related to an audio signal to be recorded has been recorded, wherein said designator prohibits designation of a recording area corresponding to an unrecorded image signal which is to be related to a recorded audio signal and prohibits designation of a recording area in which another audio signal has been recorded;
   a controller for receiving a designation result provided by said designator, producing a recording order program for controlling the recording order and the recording areas in which are to be recorded the audio signals related to the image signals, and storing the recording order program in a memory; and
   a recording unit, controllable to record the audio signal in a recording area, designated according to the designation result stored in the memory from among the plural recording areas of the recording medium.

2. An information recording apparatus which records an audio signal by relating the audio signal to an image signal when the image signal or the audio signal is recorded on a recording medium having plural recording areas which differ from each other, said apparatus comprising:
   a designator for designating, from among the plural recording areas of the recording medium, a recording area where the image signal to be related to an audio signal to be recorded has been recorded, wherein said designator prohibits designation of a recording area corresponding to an unrecorded image signal which is to be related to a recorded audio signal and prohibits designation of a recording area in which another audio signal has been recorded;
   a controller for receiving a designation result provided by said designator, producing a recording order program for controlling the recording order and the recording areas in which are to be recorded the audio signals related to the image signals, and storing the recording order program in a memory; and
   a recording unit, controllable to record the audio signal in a recording area, designated according to the designation result stored in the memory from among the plural recording areas in the recording medium.

3. An information recording apparatus according to claim 2, wherein said designator designates any of (i) a recording area in which an image signal for one field is recorded or (ii) a recording area in which an image signal for one frame is recorded, as a recording area for recording the image signal to be correlated with the audio signal to be recorded.

4. An information recording method which records an audio signal by relating the audio signal to an image signal when the image signal or the audio signal is recorded on a recording medium having plural recording areas which differ from each other, said method comprising the steps of:
   a designating step of designating, from among the plural recording areas of the recording medium, a recording area where the image signal to be related to an audio signal to be recorded has been recorded, wherein said designating step includes prohibiting designation of a recording area corresponding to an unrecorded image signal which is to be related to a recorded audio signal and includes prohibiting designation of a recording area in which another audio signal has been recorded;
   a controlling step of receiving a designation result provided in said designating step, producing a recording order program for controlling the recording order and the recording areas in which are to be recorded audio signals related to the image signals, and storing the recording order program in a memory; and
   a recording step, controllable to record the audio signal in a recording area, designated according to the designation result stored in the memory, from among the plural recording areas of the recording medium.

5. An information recording method which records an audio signal by relating the audio signal to an image signal when the image signal or the audio signal is recorded on a recording medium having plural recording areas which differ from each other, said method comprising the steps of:
   a designating step of designating, from among the plural recording areas of the recording medium, a recording area where the image signal to be related to an audio signal to be recorded has been recorded, wherein said designating step includes prohibiting designation of a recording area corresponding to an unrecorded image signal which is to be related to a recorded audio signal and includes prohibiting designation of a recording area in which another audio signal has been recorded;
   a controlling step of receiving a designation result provided in said designating step, producing a recording order program for controlling the recording order and the recording areas in which are to be recorded audio signals related to the image signals and storing the recording order program in a memory; and
   a recording step, controllable to record the audio signal into a recording area, designated according to the designation result stored in the memory from among the plural recording areas of the recording medium.

6. An information recording method according to claim 5, wherein said designating step includes designating any of (i) a recording area in which an image signal for one field is recorded or (ii) a recording area in which an image signal for one frame is recorded, as a recording area for recording the image signal to be correlated with the audio signal to be recorded.

7. An information recording apparatus which records an audio signal by relating the audio signal to an image signal when the image signal or the audio signal is recorded on a recording medium having plural recording areas which differ from each other, said apparatus comprising;

a designator for designating, from among the plural recording areas of the recording medium, a recording area where the image signal to be related to an audio signal to be recorded and reserving the recording area as an image recording area for recording an image signal in a case where the image signal is not recorded in the designated recording area;

a controller for receiving a designation result provided by said designator, producing a recording order program for controlling the recording order and the recording areas in which are to be recorded the audio signals related to the image signals, storing the recording order program in a memory and assigning the recording area reserved by said designator to an image recording area for recording an image signal; and a recording unit, controllable to record the audio signal into a recording area, designated according to the designation result stored in the memory from among the plural recording areas of the recording medium.

* * * * *